J. H. KINTZELE.
GEARING.
APPLICATION FILED SEPT. 26, 1918.

1,380,390.

Patented June 7, 1921.

WITNESS.
Charles A. Becker.

INVENTOR.
JULIUS H. KINTZELE
BY Rippey & Kingsland,
HIS ATTORNEYS.

UNITED STATES PATENT OFFICE.

JULIUS H. KINTZELE, OF ST. LOUIS, MISSOURI, ASSIGNOR, BY MESNE ASSIGNMENTS, TO CENTRAL MANUFACTURING COMPANY, A CORPORATION OF DELAWARE.

GEARING.

1,380,390.      Specification of Letters Patent.      Patented June 7, 1921.

Application filed September 26, 1918. Serial No. 255,798.

*To all whom it may concern:*

Be it known that I, JULIUS H. KINTZELE, a citizen of the United States, residing at the city of St. Louis and State of Missouri, have invented a new and useful Gearing, of which the following is a specification.

This invention relates to gearing.

An object of the invention is to provide a novel and efficient gearing for machines requiring a reverse movement, comprising mechanism for operating the machine and including means for reversing the movement of the machine or driven part thereof while the driving mechanism or gearing continues to operate in the same direction.

In the drawing—

Figure 1:
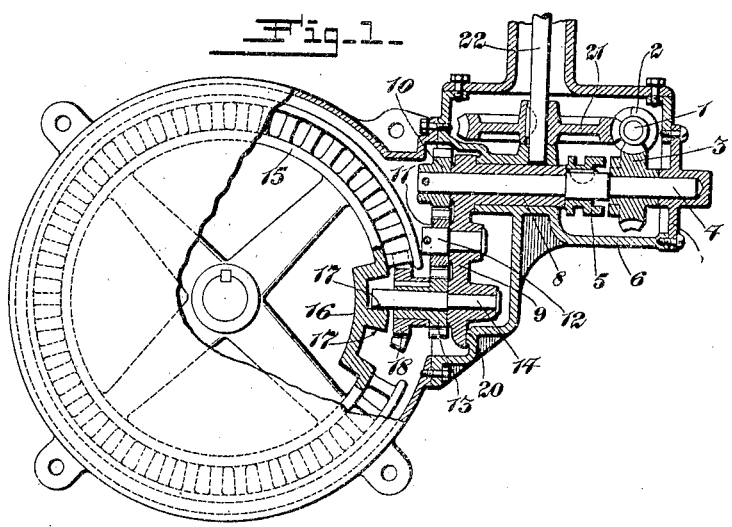
Figure 1 is a view illustrating my invention in connection with a portion of a washing machine.

As shown the drive shaft 1 is arranged to be rotated constantly in one direction. A worm 2 on the drive shaft meshes with a worm gear 3 mounted loosely on a shaft 4 supported at right angles to the shaft 1. A clutch member 5 on the shaft 4 is movable into and out of engagement with the hub of the worm gear 3 so that said gear may be locked in connection with the shaft 4 to rotate the shaft, or released in order to leave the shaft stationary while the worm gear continues to rotate. The clutch device is of familiar construction and the specific details thereof are unimportant, since it is obvious that any appropriate clutch device may be employed for this purpose.

The portion of the gearing just described is inclosed within a case comprising a support 6 provided with an end wall 7 having a bearing for one end of the shaft 4. The opposite end of the shaft 4 is supported within a sleeve 8 extending from a swinging arm 9 into an appropriate bearing in the case 6.

A pinion 10 which is fast on the shaft 4 meshes with an intermediate pinion 11 on a supporting stud 12 carried by the swinging arm 9. The pinion 11 meshes with a pinion 13 on the supporting shaft 14 carried by the swinging arm 9.

In the specific form of the invention shown the mechanism to be operated includes a gear wheel 15, the teeth of which are engageable on opposite sides. If desired the gear wheel 15 may be of the construction shown in which the teeth are in the form of radial pins in connection with two rings constituting a part of the wheel, although it is obvious that the teeth of the gear wheel may be otherwise arranged if desired. As shown the teeth of the wheel 15 are not continuous throughout the circumference of the wheel, but there is a space at one side and in that space a block 16 is supported having cams 17 on its opposite sides.

An appropriately formed pinion 18 is driven by the pinion 13 and meshes with the large gear wheel 15 so that when the gearing is in operation the large gear 15 will be driven. The end of the shaft 14 extends into the line of movement of the cam block 16 so that when the pinion 18 is in engagement with the last tooth at either side of the cam block 16 the end of the shaft 14 engages the cam 17 on that side of the cam block. Due to the shape of the cam and the fact that the pinion 18 remains in engagement with the gear 15, the pinion 18 is moved around to the opposite side of the gear 15. Since the pinion 18 continues to revolve in the same direction and becomes thus engaged with the opposite side of the gear 15, the latter will be turned in the opposite direction from its former movement, and this operation is repeated once during each revolution of the large gear 15.

Figure 2:
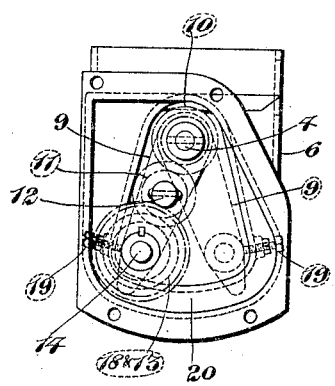
Fig. 2 is a view showing the support for the pinions included in the train of gearing for driving the driven mechanism.
Figure 3:
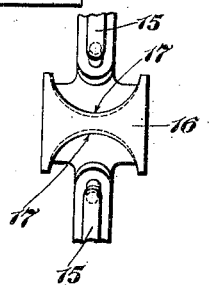
Fig. 3 is a view illustrating the face of the cam device for swinging the pinions to opposite sides of the large gear constituting a part of the driven mechanism and by which the driven mechanism is operated alternately in opposite directions.

The arm 9 is within a housing and extent of lateral movement thereof is limited so that the pinion 18 will be positively retained in engagement with the gear 15. As shown the extent through which the arm may move may be varied. The stops or abutments for limiting extent of swinging movement of the arm are in the form of screws 19 (Fig. 2) which may be adjusted to different positions to form stops for the swinging arm.

The arm also operates against a supporting portion 20 of the housing which constitutes a strong support to prevent the parts from becoming loose or displaced.

The same driving mechanism may be employed for driving various types of machines and I do not confine myself to the use thereof in connection with a washing machine, although I have found its use in that embodiment highly satisfactory.

As shown in Fig. 1, other mechanisms may also be driven from the drive shaft 1 as, for instance, gearing for operating a wringer. A part of such gearing is shown including a worm gear 21 mounted on a shaft 22 adapted to operate the wringer mechanism.

I do not restrict myself to unessential details but what I claim and desire to secure by Letters Patent, is:—

1. Gearing of the character described comprising a gear wheel, a support, a shaft journaled for rotation in said support at right-angles to the axis of the gear wheel, means for rotating said shaft, a pinion attached to said shaft, an arm having one end pivoted on said support and arranged to swing on its pivot from one position to another, a support against which the opposite end of said arm slides in its movements, means limiting swinging movement of said arm, a pinion supported by said arm meshing with the pinion on said shaft, a shaft supported by said arm, a pinion on said last-named shaft driven by said second-named pinion, and an additional pinion on said last-named shaft driven by said last-named pinion meshing with said gear wheel.

2. Gearing of the character described comprising a gear wheel, a support, a shaft journaled for rotation in said support at right-angles to the axis of the gear wheel, means for rotating said shaft, a pinion attached to said shaft, an arm, a pivot connection between one end of said arm and said support permitting said arm to swing from one position to another, a support against which the opposite end of said arm slides, a pinion supported by said arm in mesh with the pinion on said shaft, a shaft supported by said arm, a pinion on said second-named shaft meshing with the second-named pinion, an additional pinion on said second-named shaft meshing with said gear wheel, means for swinging said arm to different positions to enable said last-named pinion to mesh with opposite sides of said gear wheel, and elements supported by said support holding said arm in position to prevent said last-named pinion from becoming disconnected from said gear wheel at any time during the entire movement of said gear wheel.

3. Gearing of the character described, comprising a gear wheel to be driven, a support, a sleeve journaled in said support for rocking movements, a shaft revolubly journaled in said sleeve, means for rotating said shaft, an arm in connection with said sleeve, a pinion supported by said arm in mesh with said gear wheel, means for driving said pinion from said shaft, means for swinging said arm to different positions to reverse the direction of movement of said gear wheel, and adjustable stops carried by said support for limiting extent of movement of said arm.

4. Gearing of the character described, comprising a gear wheel to be driven, a support, a sleeve journaled in said support for rocking movements, a shaft revolubly journaled in said sleeve, means for rotating said shaft, an arm in connection with said sleeve, a pinion supported by said arm in mesh with said gear wheel, means for driving said pinion from said shaft, means for swinging said arm to different positions to reverse the direction of movement of said gear wheel, adjustable stops carried by said support for limiting extent of movement of said arm, and a guide for said arm on said support.

JULIUS H. KINTZELE.